US007876225B2

United States Patent
Mickle et al.

(10) Patent No.: US 7,876,225 B2
(45) Date of Patent: Jan. 25, 2011

(54) METHODS AND APPARATUS FOR SWITCHING A TRANSPONDER TO AN ACTIVE STATE, AND ASSET MANAGEMENT SYSTEMS EMPLOYING SAME

(75) Inventors: Marlin H. Mickle, Pittsburgh, PA (US); Alex K. Jones, Pittsburgh, PA (US); James T. Cain, Pittsburgh, PA (US); Peter J. Hawrylak, Woodstown, NJ (US); Frank Marx, Pittsburgh, PA (US); Raymond R. Hoare, Pittsburgh, PA (US)

(73) Assignee: University of Pittsburgh - Of The Commonwealth System of Higher Education, Pittsburgh, PA (US)

( * ) Notice: Subject to any disclaimer, the term of this patent is extended or adjusted under 35 U.S.C. 154(b) by 467 days.

(21) Appl. No.: 11/678,296

(22) Filed: Feb. 23, 2007

(65) Prior Publication Data
US 2007/0205873 A1    Sep. 6, 2007

Related U.S. Application Data

(60) Provisional application No. 60/776,046, filed on Feb. 23, 2006.

(51) Int. Cl.
*G08B 13/14* (2006.01)
(52) U.S. Cl. .............. 340/572.4; 340/572.7; 340/572.8; 340/539.22; 340/870.01; 340/10.5; 235/385; 235/492; 343/850; 343/860; 343/795
(58) Field of Classification Search .............. 340/572.4, 340/572.7, 572.8, 539.22, 870.01, 10.5; 235/385, 235/492; 343/850, 860, 795
See application file for complete search history.

(56) References Cited

U.S. PATENT DOCUMENTS

| 5,424,727 | A | * | 6/1995 | Shieh .......................... 340/928 |
| 5,469,180 | A | | 11/1995 | Wiggenhorn |
| 6,127,799 | A | | 10/2000 | Krishnan |
| 6,282,407 | B1 | * | 8/2001 | Vega et al. ................. 455/41.1 |
| 6,480,110 | B2 | | 11/2002 | Lee et al. |
| 6,621,467 | B1 | * | 9/2003 | Marsh ........................ 343/850 |
| 6,650,227 | B1 | | 11/2003 | Bradin |
| 6,697,030 | B2 | | 2/2004 | Gleener |
| 7,023,342 | B2 | | 4/2006 | Corbett et al. |
| 7,209,030 | B2 | * | 4/2007 | Nolan et al. ........... 340/426.36 |
| 2003/0181229 | A1 | | 9/2003 | Forster et al. |
| 2004/0193449 | A1 | | 9/2004 | Wildman et al. |
| 2006/0022800 | A1 | | 2/2006 | Krishna et al. |
| 2006/0132302 | A1 | * | 6/2006 | Stilp ..................... 340/539.22 |

* cited by examiner

FOREIGN PATENT DOCUMENTS

WO    WO 02/18279    3/2002

*Primary Examiner*—Tai T Nguyen
(74) *Attorney, Agent, or Firm*—Eckert Seamans Cherin & Mellott, LLC; Philip E. Levy, Esquire

(57) ABSTRACT

A transponder that may be used as an RFID tag includes a passive circuit to eliminate the need for an "always on" active RF receiving element to anticipate a wake-up signal for the balance of the transponder electronics. This solution allows the entire active transponder to have all circuit elements in a sleep (standby) state, thus drastically extending battery life or other charge storage device life. Also, a wake-up solution that reduces total energy consumption of an active transponder system by allowing all non-addressed transponders to remain in a sleep (standby) state, thereby reducing total system or collection energy. Also, the transponder and wake-up solution are employed in an asset tracking system.

22 Claims, 8 Drawing Sheets

METHODS AND APPARATUS FOR SWITCHING A TRANSPONDER TO AN ACTIVE STATE, AND ASSET MANAGEMENT SYSTEMS EMPLOYING SAME

CROSS-REFERENCE TO RELATED APPLICATION

This application claims the benefit of U.S. Provisional Application No. 60/776,046, entitled "Methods and Apparatus for Switching a Transponder to an Active State, and Asset Management Systems Employing Same," which was filed on Feb. 23, 2006, the disclosure of which is incorporated herein by reference.

GOVERNMENT CONTRACT

This work was supported in part by a grant from NASA under Contract No. NNK040AZ9C. The United States government may have certain rights in the invention described herein.

FIELD OF THE INVENTION

The present invention relates to transponders, such as RFID tags, and in particular to methods and apparatus for switching a transponder to an active state and asset managements system that employ such transponders.

BACKGROUND OF THE INVENTION

The use of radio frequency identification (RFID) systems is expanding rapidly in a wide range of application areas. RFID systems consist of a number of radio frequency tags or transponders (RFID tags) and one or more radio frequency readers or interrogators (RFID readers). The RFID tags include one or more integrated circuit (IC) chips, such as a complementary metal oxide semiconductor (CMOS) chip, and an antenna connected thereto for allowing the RFID tag to communicate with an RFID reader over an air interface by way of RF signals. In a typical RFID system, one or more RFID readers query the RFID tags for information stored on them, which can be, for example, identification numbers, user written data, or sensed data. RFID systems have thus been applied in many application areas to track, monitor, and manage items as they move between physical locations.

RFID tags can generally be categorized as either passive tags or active tags. Passive RFID tags do not have an internal power supply. Instead, the relatively small electrical current induced in the antenna of a passive RFID tag by the incoming RF signal from the RID reader provides enough power for the IC chip or chips in the tag to power up and transmit a response. Most passive RFID tags generate signals by backscattering the carrier signal sent from the RFID reader. Thus, the antenna of a passive RFID tag has to be designed to both collect power from the incoming RF signal and transmit (or reflect, e.g., backscatter) the outbound backscatter signal. Due to power limitations, the ability to provide devices such as sensors or microprocessors on passive RFID tags is limited. Passive RFID tags do, however, have the advantage of a near unlimited lifetime as they obtain their power from the RF signal sent from the RFID reader.

Active RFID tags, on the other hand, have their own internal power source, such as, without limitation, a battery, a fuel cell or what is commonly known as a super capacitor. The internal power source is used to power the IC chip or chips and discrete circuit elements, which typically include an RF receiver, an RF transmitter, and some type of controller, such as microcontroller or other processor, and any other electronics provided on the active RFID tag. As a result, active RFID tags can include relatively high power devices such as sensors, microprocessors, receivers and transmitters. Also, because of the on-board power, active RFID tags typically have longer ranges and larger memories than passive RFID tags. The internal power source, however, also means that active RFID tags typically have a lifetime that is limited by the lifetime of the power source. Thus, periodic maintenance is required.

As noted above, multiple active RFID tags may be used to track, monitor, and manage multiple items/assets as they move between physical locations. In such an application, each active RFID tag is affixed to an item/asset that is located in a particular location or environment, such as in a building. Building shall refer to any structure including, without limitation, a warehouse, a hospital, an office building, or even a vehicle. In current RFID systems, the active RFID tags, when deployed in such a manner, are done so in a state where (i) an RF receiver of the tag is in an active state for receiving RF signals, and (ii) the controller is in a low power inactive (sleep) state to preserve power. When one or more of the active RFID tags are to be queried, the RFID reader sends out a wake-up signal that is received by the RF receiver of each tag. Tags may also be on continuously not requiring a wake-up signal. Upon receipt of the signal, the RF receiver in each tag will then send a signal to the controller of the tag that causes it to move from the inactive state to an active (wake-up) state. For example, in RFID systems implemented according to the ISO 18000 Part 7 standard, when one or more tags are to be queried, the reader will send out a 30 KHz tone lasting for a period of approximately 2.5 seconds. Upon receipt of the tone, the RF receiver in each tag will wake-up the controller in the tag. The RFID reader then sends out signals intended for particular ones of the tags. Those particular tags for which the signals are intended will then perform the requested action, and the remaining tags (i.e., those tags not currently of interest to the reader) will move back to a sleep state.

The multiple active RFID tag arrangement just described presents at least two power management problems. First, each active RFID tag that is deployed is required to have at least one component, i.e., an RF receiver, in an active, relatively high power consuming state at all times so that it can listen for the wake-up signal. Second, when the RFID reader needs to query one or more particular tags, all of the tags that are deployed are woken up (for example, according to the ISO 18000, Part 7 standard), i.e., their controllers are caused to move to an active, relatively high power consuming state. Only when a particular tag determines that the query in question is not intended for it will it then move back to the sleep state. As will be appreciated, these problems result in unnecessary use of power from the power source (e.g., battery) of each tag, and therefore decreases the lifetime of each tag.

SUMMARY OF THE INVENTION

The present invention overcomes at least two problems associated with (1) current active RFID tags, and (2) current active RFID tag wake-up protocols. The first problem is that in current RFID tags, an active RF receiving element must always be awake to anticipate a wake-up signal for the balance of the tag electronics. The present invention uses a passive circuit to eliminate the need for an "always on" active RF receiving element to anticipate a wake-up signal for the balance of the tag electronics. This solution allows the entire active RFID tag to have all circuit elements in a sleep (standby) state, thus drastically extending battery life or other charge storage device life and thus essentially eliminating shelf maintenance on the active RFID tag. The second problem is that in current active RFID tag systems, the electronics of all of the RFID tags in a system are awakened in response to wake-up signals even if the signal is not intended for a particular tag or tags. The present solution provides a major energy saving circuit that eliminates the need to wake up all of the RFID tags in response to each wake-up signal. This circuit thus reduces total energy consumption of an active RFID tag (or sensor) system or collection of devices by allowing all non-addressed tags (sensors) to remain in a sleep (standby) state, thereby reducing total system or collection energy. This second circuit can be used in conjunction with the first passive circuit mentioned above or in conjunction with any existing active RFID tag (sensor) systems. Thus, the elements of the present invention capitalize on the benefits of an active RFID tag while eliminating the problems discussed above, thus moving active RFID tags closer to a passive tag operation.

In one embodiment, the present invention relates to a transponder apparatus, such as, without limitation, an RFID tag, that includes an electronic device, such as a processing unit (e.g., microprocessor or microcontroller), that is capable of being in an inactive, sleep state and an active state, a power source, such as a battery, in electronic communication with the electronic device for providing power to the electronic device, and a switch having an antenna for receiving at least one RF signal. The switch converts the at least one RF signal into at least one DC signal. The at least one DC signal causes the electronic device to move from the inactive, sleep state to the active state. Preferably, the switch does not require power from the power source or another power source within or connected to the transponder apparatus. The switch may, in one embodiment, include a rectifying circuit, such as a charge pump, for converting the at least one RF signal into the at least one DC signal. The switch in that embodiment may also further include a matching network electrically connected to the antenna, wherein the charge pump is electrically connected to an output of the matching network. In yet another embodiment, the transponder apparatus may further include an RF transmitter and/or an RF receiver that is/are in electronic communication with the processing unit.

In one particular embodiment, the antenna is tuned to a particular frequency or range of frequencies. In this embodiment, the at least one RF signal has a frequency that is substantially equal to the particular frequency or is within the range of frequencies.

The at least one DC signal may be provided to the electronic device to directly cause the electronic device to move from the inactive, sleep state to the active state. Alternatively, the transponder apparatus may further include a filtering circuit in electronic communication with the switch, wherein the at least one DC signal is provided to the filtering circuit. The filtering circuit provides a wake-up signal to the electronic device to cause the electronic device to move from the inactive, sleep state to the active state only if the at least one DC signal and/or the at least one RF signal has a predetermined format, such as a predetermined number of bursts each having a predetermined duration.

In another embodiment, the transponder apparatus further includes one or more additional switches that each has an additional antenna for receiving at least one additional RF signal. Each additional switch converts the at least one additional RF signal into at least one additional DC signal. The at least one RF signal and each of the at least one additional RF signals have different frequencies. In this embodiment, a logical combination of the at least one DC signal and one or more of the at least one additional DC signals causes the electronic device to move from the inactive, sleep state to the active state. Alternatively, the electronic device may be caused to move from the inactive, sleep state to the active state only if the at least one DC signal and the at least one additional DC signals are created in a particular sequence.

In another embodiment, the present invention relates to a method of moving an electronic device, such as a processing unit, included in a transponder apparatus from an inactive, sleep state to an active state, wherein the electronic device consumes power from a power source of the transponder apparatus in the active state. The method includes receiving at least one RF signal and converting the at least one RF signal into at least one DC signal without consuming power from the power source or another power source within or connected to the transponder apparatus. The method further includes providing a wake-up signal to the electronic device in response to receipt of the at least one RF signal that causes the electronic device to move from the inactive, sleep state to the active state. The wake-up signal of the method may, in one particular embodiment, be the at least one DC signal. Alternatively, the method may include determining whether the at least one DC signal or the at least one RF signal has a predetermined format, wherein the providing step comprises providing the wake-up signal (which is separate from the at least one DC signal) to the electronic device to cause the electronic device to move from the inactive, sleep state to the active state only if it is determined that the at least one DC signal or the at least one RF signal has the predetermined format. The predetermined format may include a predetermined number of bursts, each of the bursts having a predetermined duration.

In another embodiment, the method further includes receiving at least one additional RF signal and converting the at least one additional RF signal into at least one additional DC signal without requiring the consumption of power from the power source or another power source within or connected to the transponder apparatus. In this embodiment, the at least one RF signal and each of the at least one additional RF signals have different frequencies, and the providing step comprises providing the wake-up signal to the electronic device to cause the electronic device to move from the inactive, sleep state to the active state only in response to a logical combination of the at least one DC signal and one or more of the at least one additional DC signals. Alternatively, the wake-up signal may be provided to the electronic device only if the at least one DC signal and the at least one additional DC signals are created in a particular sequence and/or if the at least one RF signal and each of the at least one additional RF signals are received in a particular sequence.

Another aspect of the present invention relates to a system for tracking a plurality of assets that includes a central computer system that maintains a plurality of records relating to the assets, and a plurality of transponders, wherein each of the transponders is associated with a respective one of the assets and stores an identifier identifying the particular asset with which it is associated. Each of the transponders includes an electronic device capable of being in an inactive, sleep state and an active state, a power source in electronic communication with the electronic device for providing power to the electronic device, and a switch having an antenna for receiving at least one RF signal that is generated at the direction of the central computer system. The switch converts the at least one RF signal into at least one DC signal that causes the electronic device to move from the inactive, sleep state to the active state. When the electronic device is in the active state, the transponder generates and transmits a response signal including the identifier identifying the particular asset with which the transponder is associated. The response signal is then used to update a particular one of the records maintained by the central computer system relating to the asset identified by the identifier in the response signal. Preferably, the switch in each of the transponders does not require power from the power source of the transponder or another power source within or connected to the transponder. The transponders may be any of the various embodiments described above. As such, individual transponders or groups of transponders may be selectively awakened.

In one particular embodiment, the system further includes a network with which the central computer system may communicate, a plurality of wireless access points in electronic communication with the network, and a plurality of interface devices. Each of the interface devices is adapted to (i) wirelessly communicate with at least one of the wireless access points, (ii) receive the response signal transmitted by a particular one or more of the transponders, and (iii) generate and transmit to the at least one of the wireless access points at least one second response signal that includes each identifier that was included in each response signal received by the interface device. Each at least one second response signal is transmitted to the central computer system through the network. The central computer system uses the at least one second response signal received from one or more of the interface devices to update one or more of the records.

In another particular embodiment, the system further includes a network with which the central computer system may communicate, and a plurality of interface devices. Each of the interface devices is adapted to (i) communicate with the network, (ii) receive the response signal transmitted by a particular one or more of the transponders, and (iii) generate and transmit to the network, through a wired or wireless connection, at least one second response signal that includes at least each identifier that was included in each response signal received by the interface device. Each at least one second response signal is transmitted to the central computer system through the network, and the central computer system uses the at least one second response signal received from one or more of the interface devices to update one or more of the records.

In either of these two just described embodiments, the assets are located within an environment such as one or more building (e.g., a hospital), and each of the interface devices may be associated with a particular location within the environment. In addition, each of the second response signals may include an identification of the interface device from which it was transmitted, and the central computer system may use the identification included in each second response signal to update in the records a location of one or more of the assets.

In one particular embodiment, each of the transponders has a code associated therewith, and wherein for each of the transponders in order for the at least one RF signal received by the transponder to be converted in at least one DC signal that will cause the electronic device of the transponder to move from the inactive, sleep state to the active state, the at least one RF signal received by the transponder must be formatted according to the code associated with the transponder. In another particular embodiment, each of one or more groups of selected ones of the transponders have a code associated therewith, and wherein for each of the groups of transponders in order for the at least one RF signal received by each transponder in the group to be converted into at least one DC signal that will cause the electronic device of the transponder in the group to move from the inactive, sleep state to the active state, the at least one RF signal received by the transponder in the group must be formatted according to the code associated with the group of transponders. Thus, individual transponders or groups of transponder may be selectively awakened.

In an alternative embodiment, the present invention relates to a system for tracking a plurality of assets that includes a central computer system maintaining a plurality of records relating to the assets, a network, wherein the central computer system is in electronic communication with the network, and a plurality of interface devices each being adapted to communicate with the network. In addition, the system includes a plurality of transponders, wherein each of the transponders is associated with a respective one of the assets and stores an identifier identifying the particular asset with which it is associated. Each of the transponders is adapted to receive from one of the interface devices at least one RF signal that is generated at the direction of the central computer system and in response thereto to generate and transmit a response signal including the identifier identifying the particular asset with which the transponder is associated. Each of the interface devices is adapted to (i) receive the response signal that is transmitted by each of a particular one or more of the transponders, and (ii) generate and transmit to the network at least one second response signal that includes each identifier that was included in each response signal received by the interface device. In each case, the at least one second response signal is transmitted to the central computer system through the network, and the central computer system uses the at least one second response signal received from one or more of the interface devices to update one or more of the records. For a group the transponders, the at least one RF signal that is generated at the direction of the central computer system and that causes each of the transponders in the group to generate and transmit the response signal including the identifier identifying the particular asset with which the transponder is associated may be common to the transponders in the group.

The at least one second response signal in each case may be a plurality of second response signals, wherein each of the second response signals corresponds to a respective one of the response signals that was received by the interface device and includes the identifier that was included in the corresponding one of the response signals. The central computer system may further be adapted to cause the generation of the at least one RF signal particular to one or more of the transponders in a sequential fashion, wherein corresponding response signals and second response signals are generated and transmitted in a corresponding sequential fashion. Location information associated with each interface device may be used to update the location of each of the assets as described above.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DESCRIPTION OF THE PREFERRED EMBODIMENTS

Figure 1:
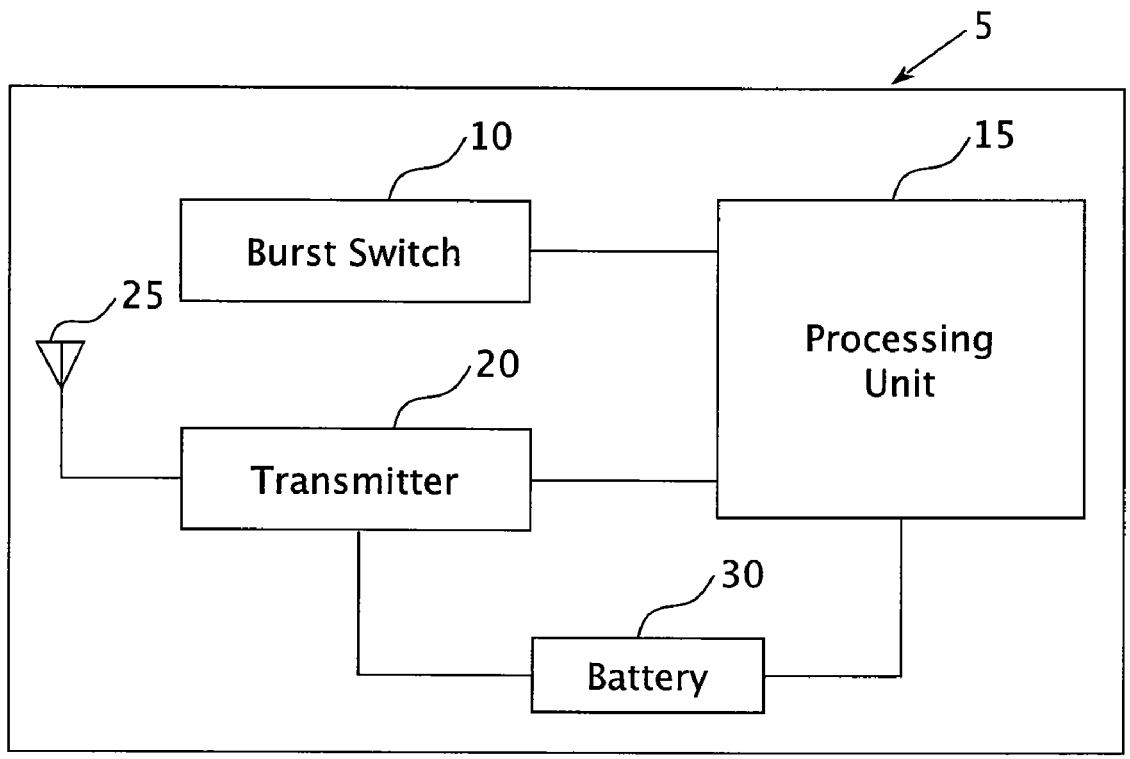
FIG. 1 is a block diagram of an active RF transponder according to one embodiment of the present invention.

FIG. 1 is a block diagram of an RF transponder 5 according to one embodiment of the present invention. The RF transponder 5 includes a burst switch 10, which is described in more detail in connection with FIG. 2. The burst switch 10 is in electronic communication with a processing unit 15, which may be, without limitation, a microprocessor, a microcontroller, or some other type of processor device. The processing unit 15 may further be another type of electronic device, such as a CMOS device or any other electronic circuit element provided on, for example, a semiconductor substrate or printed circuit board (PCB), which performs a particular function or functions. The processing unit 15 is capable of being placed into an inactive, sleep state where the current drawn by it is at a minimum. In addition, the processing unit 15 may be woken up, i.e., moved from the inactive, sleep state to an active state, upon receipt of an external input signal. An RF transmitter 20 is in electronic communication with the processing unit 15. The RF transmitter 20 may be a separate transmitter component, or may be part of a transceiver component that is capable of both transmitting and receiving RF signals. The RF transmitter 20 is, in response to commands received from the processing unit 15, able to transmit RF signals through an antenna 25 connected thereto. Like the processing unit 15, the RF transmitter 20 is capable of being placed into an inactive, sleep state where the current drawn by it is at a minimum, and can be woken up by receipt of an external input signal provided by the processing unit 15. The RF transponder 5 also includes a battery 30 which provides the power required for the operation of the processing unit 15 and the transmitter 20. The battery 30 may alternatively be replaced by another power source, such as, without limitation, a fuel cell or a super capacitor.

Figure 2:
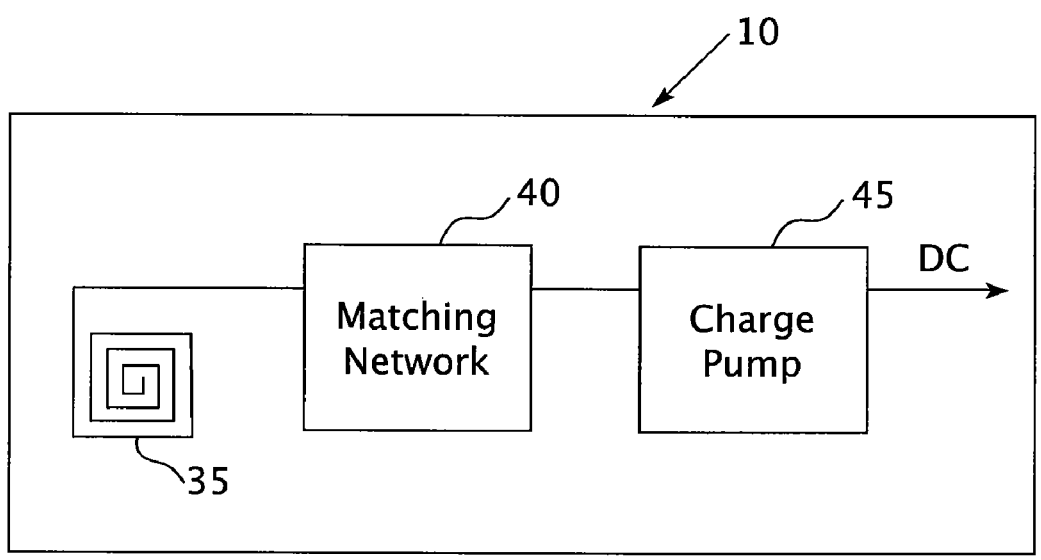
FIG. 2 is a schematic diagram of a burst switch according to an aspect of the present invention.

FIG. 2 is a schematic diagram of the burst switch 10. The burst switch 10 includes an antenna 35, which, in the embodiment shown in FIG. 2, is a square spiral antenna. The antenna 35 is electrically connected to a matching network 40, which in turn is electrically connected to a voltage boosting and rectifying circuit preferably in the form of a charge pump 45. Charge pumps are well known in the art. Basically, one stage of a charge pump essentially doubles the effective amplitude of an AC input voltage and stores the resulting increased DC voltage on an output capacitor. The voltage could also be stored using a rechargeable battery. Successive stages of a charge pump, if present, will essentially increase the voltage from the previous stage resulting in an increased output voltage. The matching network 40 matches the input impedance of the charge pump 45 to the impedance of the antenna 35 for optimal performance of the antenna 35 and optimal charge pump 45 output voltage. In one particular embodiment, the matching network 40 is an LC tank circuit formed by, for example, the inherent distributed inductance and inherent distributed capacitance of the conducing elements of the antenna 35. The antenna 35 is tuned to receive RF signals having a particular frequency or range of frequencies. The RF signals that are received by the antenna 35 are provided, in the form of an AC signal, to the charge pump 45 through the matching network 40. The charge pump 45 essentially amplifies and rectifies the received AC voltage signal and outputs the resulting DC signal. These operations are performed without requiring the consumption of power from the battery 30 or any other power source within or connected (physically) to the RF transponder 5.

Referring again to FIG. 1, in operation, the RF transponder 5 is deployed in a state wherein the processing unit 15 and the transmitter 20 are in the inactive, sleep state. As such, the draw on the battery 30 will be at a minimum. When it is desired to "wake-up" the RF transponder 5, an RF signal of an appropriate frequency is transmitted to the RF transponder 5 by, for example, an RFID reader or other suitable device. The RF signal is received by the burst switch 10, and as described above, the RF signal is used to produce a DC signal. The DC signal that is produced is provided to the sleep input (pin) of the processing unit 15, which causes the processing unit 15 to move from the inactive, sleep state to its active state. In the active state, the processing unit 15 is able to perform any action that is required, such as waking up the RF transmitter 20 and causing it to transmit a signal that contains information such as an identifier for the RF transponder 5. When finished (or after some predetermined period of time), the processing unit 15 can return to an inactive, sleep state until subsequently woken up as described herein. As will be appreciated, the burst switch 10 as shown in FIG. 2 is designed to produce a DC signal of an appropriate level for input into the sleep input of the processing unit 15 through appropriate selection of the parameters of the antenna 25, the matching network 40 and/or the charge pump 45.

A shortcoming of the RF transponder 5 shown in FIG. 1 is that spurious RF energy (noise) received by the burst switch 10 could inadvertently cause the processing unit 15 to move to the active state, thereby consuming power when not needed. Also, if a number of similar RF transponders 5 (i.e., similar meaning the antenna 35 of each is tuned to the same frequency or frequency range) are deployed together, an RF signal that is transmitted by a reader will activate all of the RF transponders 5, even if they are not all currently of interest to the reader. In other words, there is no way to selectively activate one or more of them without also activating the remaining ones of them.

Figure 3:
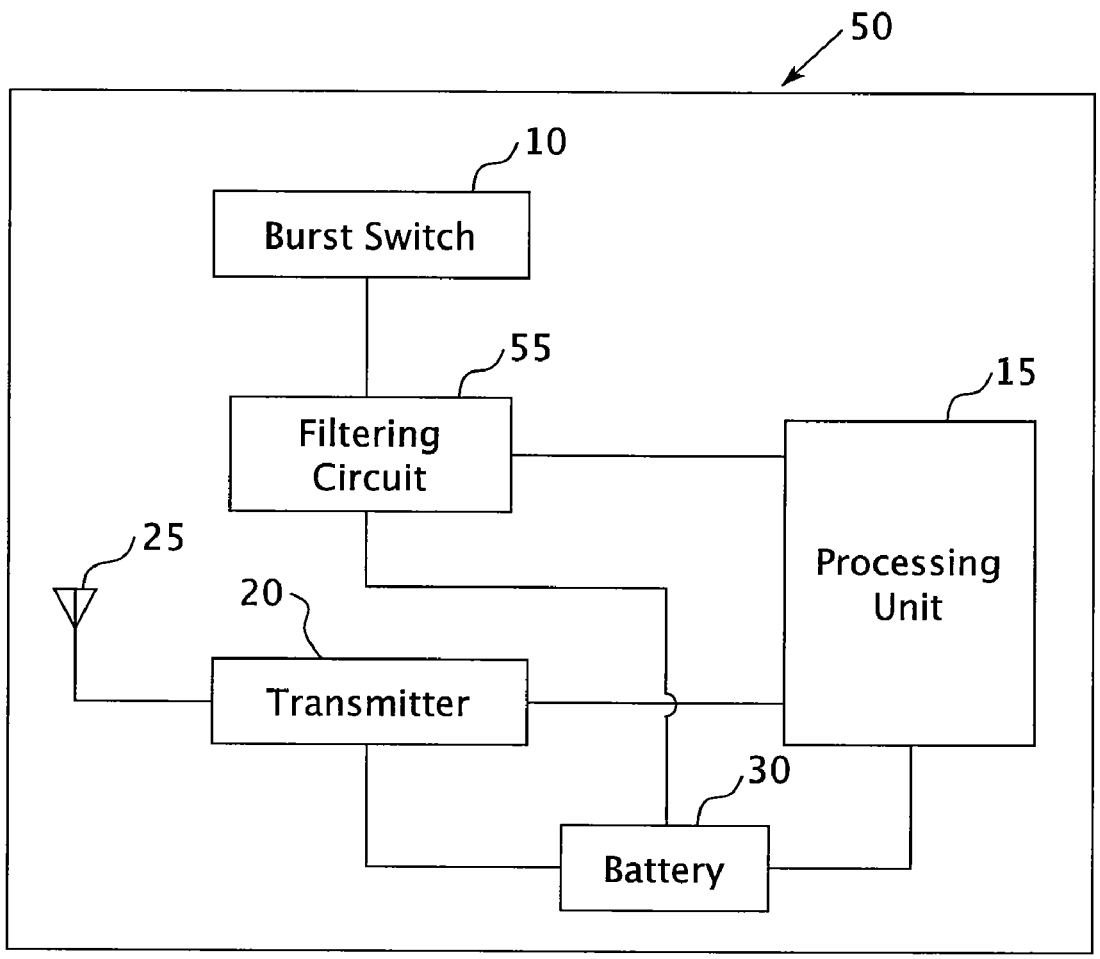
FIG. 3 is a block diagram of an RF transponder according to an alternative embodiment of the present invention.

FIG. 3 is a block diagram of an RF transponder 50 according to an alternative embodiment of the present invention that addresses the shortcomings of the simple RF transponder 5 shown in FIG. 1. As seen in FIG. 3, the RF transponder 50 is similar to the RF transponder 5 in that it includes a burst switch 10, a processing unit 15, an RF transmitter 20 connected to an antenna 25, and a battery 30. However, the RF transponder 50 further includes a low power filtering circuit 55. Specifically, as shown in FIG. 3, the DC output of the burst switch 10 is provided to the filtering circuit 55, and the output of the filtering circuit 55 is provided to the sleep input of the processing unit 15. The function of the filtering circuit 55 is twofold. First, the filtering circuit 55 prevents spurious RF energy (noise) from inadvertently causing the processing unit 15 to move from an inactive, sleep state to an active state. Second, the filtering circuit 55 provides a mechanism by which the particular RF transponder 50 in which the filtering circuit 55 is included can be selectively woken up, i.e., have its processing unit 15 selectively moved to an active state. The filtering circuit 55 performs these functions by causing a wake-up signal to be sent to the sleep input of the processing unit 15 only if a particular sequence or pattern (i.e., format) of RF signals is received by the burst switch 10.

Figure 4:
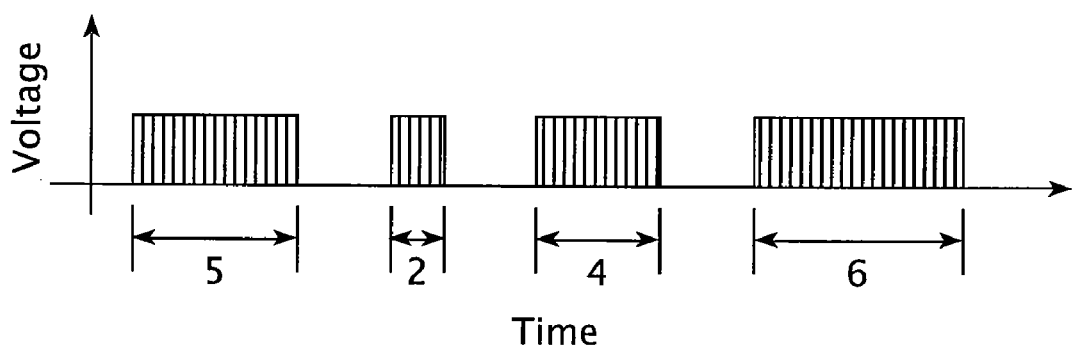
FIG. 4 is a schematic illustration of a code that may be required to awaken the transponder 50 shown in FIG. 3.

In the preferred embodiment, the filtering circuit 55 is a state machine that will generate a wake-up signal only if a particular pre-set "code" is received from the burst switch 10, wherein the code is a particular sequence of a certain number of voltage "bursts" (i.e., voltage signals of a certain (although possibly varying) length or duration; in this case, the bursts are DC signals, but bursts as used herein may also refer to RF signals of a certain (although possibly varying) length or duration) from the burst switch 10 each having a particular length expressed as a multiple of some pre-set unit of time, such as 1 millisecond. FIG. 4 shows an example of a 4 element code that may be required to be output by the burst switch 10 and received by the filtering circuit 55 in order for the filtering circuit 55 to generate a wake-up signal for waking up the processing unit 15. In the example of FIG. 4, the code that must be received is a 4 burst code consisting of a burst of length 5 (e.g., 5 milliseconds), followed by a burst of length 2 (e.g., 2 milliseconds), followed by a burst of length 4 (e.g., 4 milliseconds), followed by a burst of length 6 (e.g., 6 milliseconds). In effect, the code is 5 2 4 6. As will be appreciated, the code scheme of FIG. 4 is meant to be exemplary only, and any number of bursts of any possible length and any base length unit of time may be used for a particular code without departing from the scope of the invention.

In operation, the filtering circuit 55 will count (possibly on a dedicated counter) the number of separate bursts received and the length of each burst (the length of each burst may be stored in a register or any suitable memory). When the count reaches the pre-set number, e.g., 4, the registers (or memory) are checked for the proper code (i.e., has the proper sequence of burst lengths been received). If the code is determined to be correct, the filtering circuit 55 will generate a wake-up signal for the processing unit 15. As will be appreciated, the required code may be generated by an RFID reader by generating a sequence of an appropriate number of RF bursts wherein each RF burst is of a particular time. As described in connection with FIG. 2, each such RF burst will result in a corresponding DC voltage (DC burst) being output by the burst switch 10 having a length equal to the length of the RF burst. Thus, in order to generate the 5 2 4 6 code described above, an RF reader must output an RF burst having a length of 5 (e.g., 5 milliseconds), followed by an RF burst having a length of 2 (e.g., 2 milliseconds), followed by an RF burst having a length of 4 (e.g., 4 milliseconds), followed by an RF burst having a length of 6 (e.g., 6 milliseconds).

The filtering circuit 55 thus solves the noise problem by requiring a particular sequence of RF bursts before the processing unit 15 is awakened. The filtering circuit 55 also allows a number of RF transponders 50 to be deployed and selectively and independently awakened. In particular, each transponder 50 (or set of transponders 50 to be grouped and awakened together) that is deployed at a location can be provided with a unique code. In order for an RFID reader to wake up a particular transponder 50 (or set of grouped transponders 50), the RFID reader will need to generate the appropriate RF bursts. As an alternative, any particular RF transponder 50 may be provided with more than one code that would enable it to be awakened, wherein one code may be used to awaken the RF transponder 50 individually, and another code may be used to awaken it as part of a group of particular transponders 50.

As seen in FIG. 3, the filtering circuit 55 is connected to the battery 30 for power purposes. Preferably, the filtering circuit 55 is a device or component that may enter a low power sleep state. The filtering device 55 will remain in a sleep state until a burst is received, at which time it will move to an active state (the burst is the wake-up signal), count the burst, measure its duration, and return to sleep until the next burst is received. As a result, minimal power is consumed by the filtering circuit 55. As will be appreciated, the filtering circuit 55 thus may be any low power electronic device that can be turned on for a short period of time, increment a counter, measure a burst length, and then go back to sleep.

Figure 5:
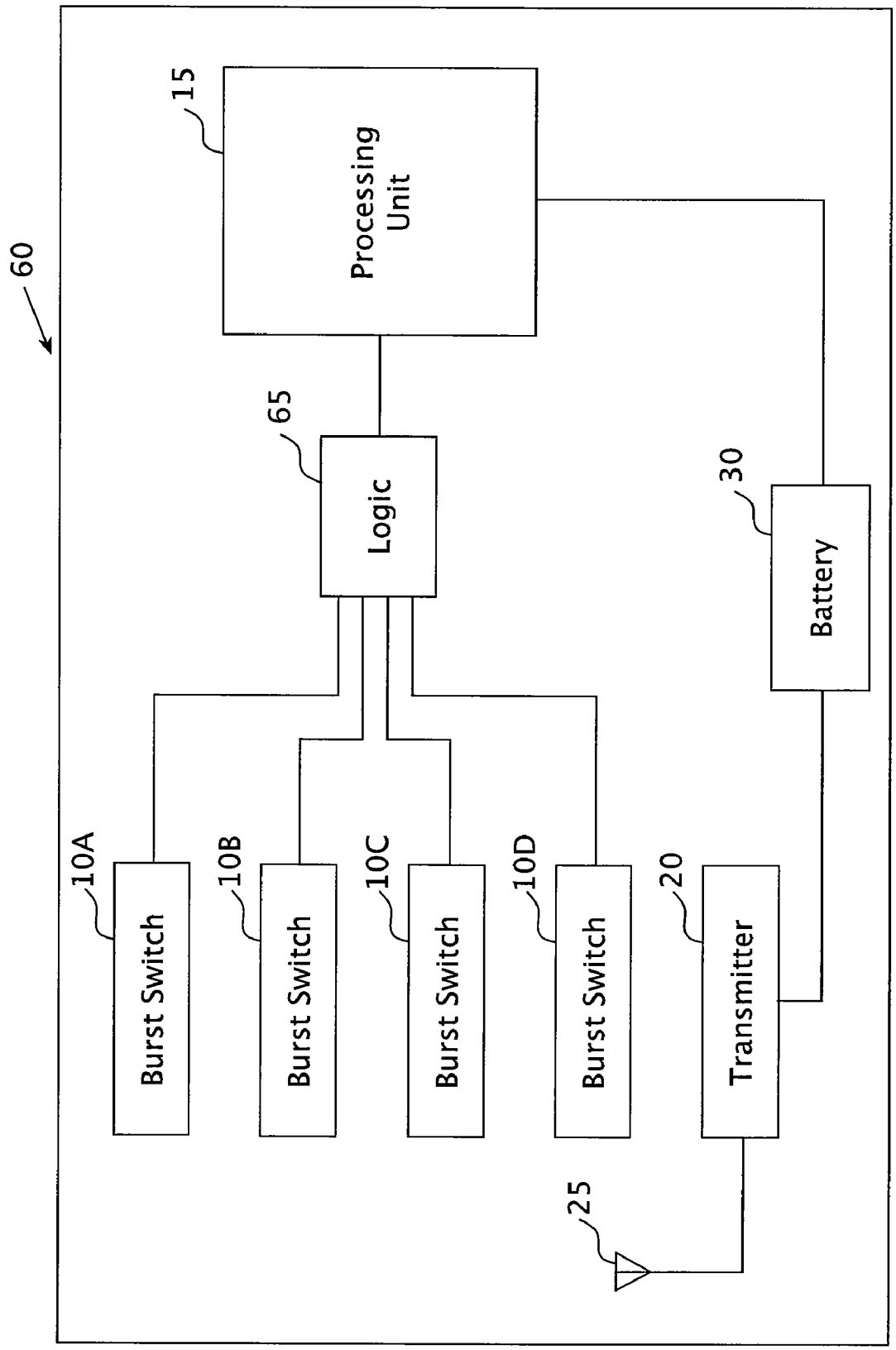
FIG. 5 is a block diagram of an RF transponder according to a further alternative embodiment of the present invention.

FIG. 5 is a block diagram of an RF transponder 60 according to a further alternative embodiment of the present invention that includes an alternate arrangement for addressing the shortcomings of the simple RF transponder 5 shown in FIG. 1, i.e., the noise problem and the inability to discriminate among multiple transponders. As seen in FIG. 5, the RF transponder 60 is similar to the RF transponder 5 in that it includes a processing unit 15, an RF transmitter 20 connected to an antenna 25, and a battery 30. However, the RF transponder 60 includes multiple burst switches 10A, 10B, 10C, and 10D wherein the antenna 35 of each burst switch 10A, 10B, 10C, 10D is tuned to a different frequency or range of frequencies (although only four burst switches 10 are shown, more or less than four may be employed to suit the particular needs of the application in question without departing from the scope of the present invention). In addition, as represented by passive logic combination 65, the burst switches 10A, 10B, 10C, 10D are topologically interconnected in manner that implements a selected logical combination, such as an AND, an OR, or any other logic operation or combination of operations. It will be appreciated that each burst switch 10A, 10B, 10C, 10D will only output a DC signal if it receives an RF signal of the appropriate frequency (each referred to as a "burst switch frequency" for convenience). Thus, the passive logic combination 65 can be chosen to only provide a wake-up signal to the processing unit 15 if a particular combination of the burst switch frequencies is received. For example, the passive logic combination 65 could be implemented as an AND such that all of the burst switch frequencies must be received for a wake-up signal to be sent to the processing unit 15. Alternatively, the passive logic combination 65 could be implemented with a series of ANDs and ORs such that any two, or any three of the burst switch frequencies or a particular two or a particular three of the burst switch frequencies must be received for a wake-up signal to be sent to the processing unit 15.

Thus, because particular burst switch frequencies must be received to wake-up the processing unit 15, the arrangement shown in FIG. 5 prevents spurious RF energy (noise) from inadvertently causing the processing unit 15 to move from an inactive state to an active state. In addition, the arrangement shown in FIG. 5 may also be used to provide a mechanism by which the particular RF transponder 60 in which it is included can be selectively woken up, i.e., have its processing unit 15 selectively moved to an active state. Specifically, a number of transponders 60 may be deployed with different burst switch frequencies and/or different passive logic combinations 65 such that an RFID reader can generate appropriate RF signals to selectively wake-up certain ones of the RF transponders 60. For example, one RF transponder 60 could be deployed wherein all of the burst switch frequencies are required to wake it up, another RF transponder 60 could be deployed wherein a particular two of the burst switch frequencies are required to wake it up, another RF transponder 60 could be deployed wherein a different particular two of the burst switch frequencies are required to wake it up, another RF transponder 60 could be deployed wherein a particular three of the burst switch frequencies are required to wake it up, and so on.

In an alternative embodiment of the RF transponder 60, instead of providing the passive logic combination 65, the burst switches 10A, 10B, 10C, and 10D could be combined and biased with respect to one another such that the burst frequencies must be received in a particular pre-set order for a wake-up signal to be sent to the processing unit 15. In such an arrangement, each burst switch 10 following a first one of the burst switches 10 would require the preceding burst switch 10 to be energized before it would be capable of outputting a DC signal. In this sense, the arrangement of burst switches 10A, 10B, 10C, 10D functions like an electronic combinational lock, and as such is able to prevent noise from inadvertently waking up the processing unit 15 and is able to allow the RF transponder 60 in which it is implemented to be selectively woken-up.

Figure 6:
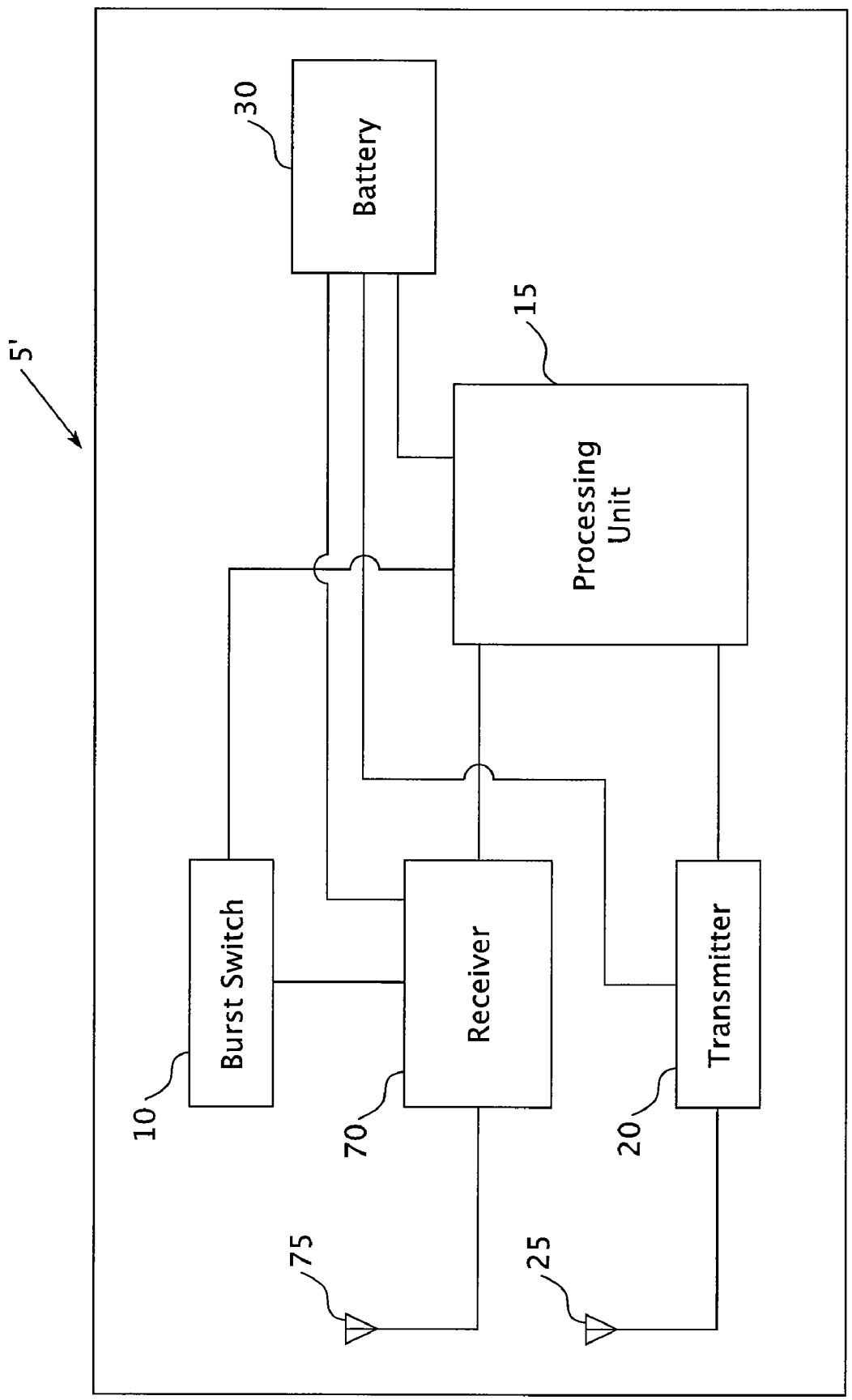
FIG. 6 is a block diagram of an alternative RF transponder that is similar to the RF transponder shown in FIG. 1 but that further includes an RF receiver.
Figure 7:
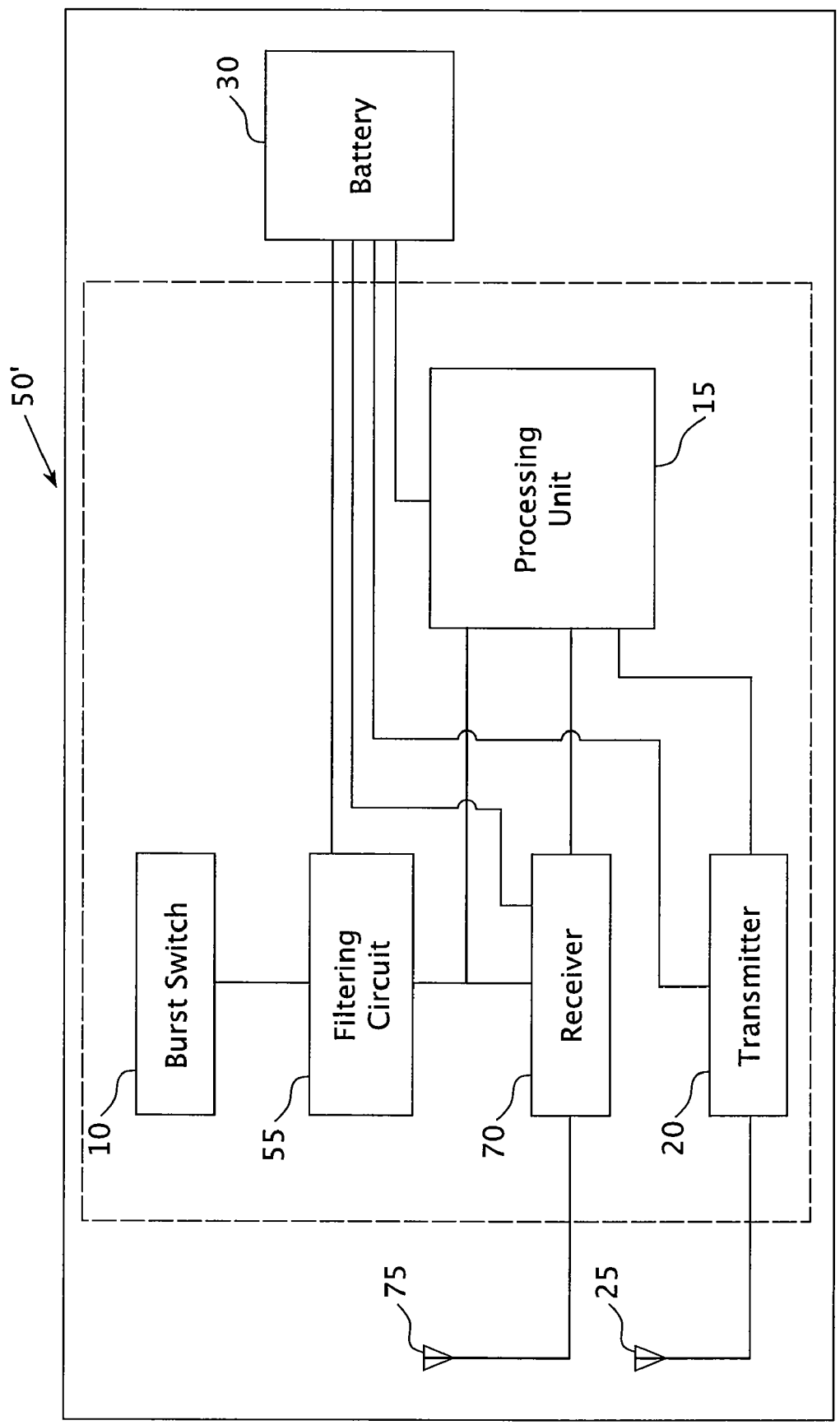
FIG. 7 is a block diagram of an alternative RF transponder that is similar to the RF transponder shown in FIG. 3 but that further includes an RF receiver.

FIG. 6 is a block diagram of an alternative RF transponder 5' that is similar to RF transponder 5 shown in FIG. 1 except that it further includes an RF receiver 70 connected to an antenna 75. The RF receiver 70 may be caused to move from an inactive, sleep state to an active state by the burst switch 10 in order allow for further communication with the processing unit 15 via the RF receiver 70. The communications may be according to an established standard, such as the ISO 18000 Part 7 standard. Similarly, FIG. 7 is a block diagram of an alternative RF transponder 50' that is similar to RF transponder 50 shown in FIG. 3 except that it also further includes an RF receiver 70 connected to an antenna 75. The RF receiver 70 in this embodiment may be caused to move from an inactive, sleep state to an active state by the burst switch 10 and filtering circuit 55 in the manner described elsewhere herein in order to allow for further communication with the processing unit 15 of the RF transponder 50' via the RF receiver 70. Again, the communications may be according to an established standard, such as the ISO 18000 Part 7 standard.

Figure 8:
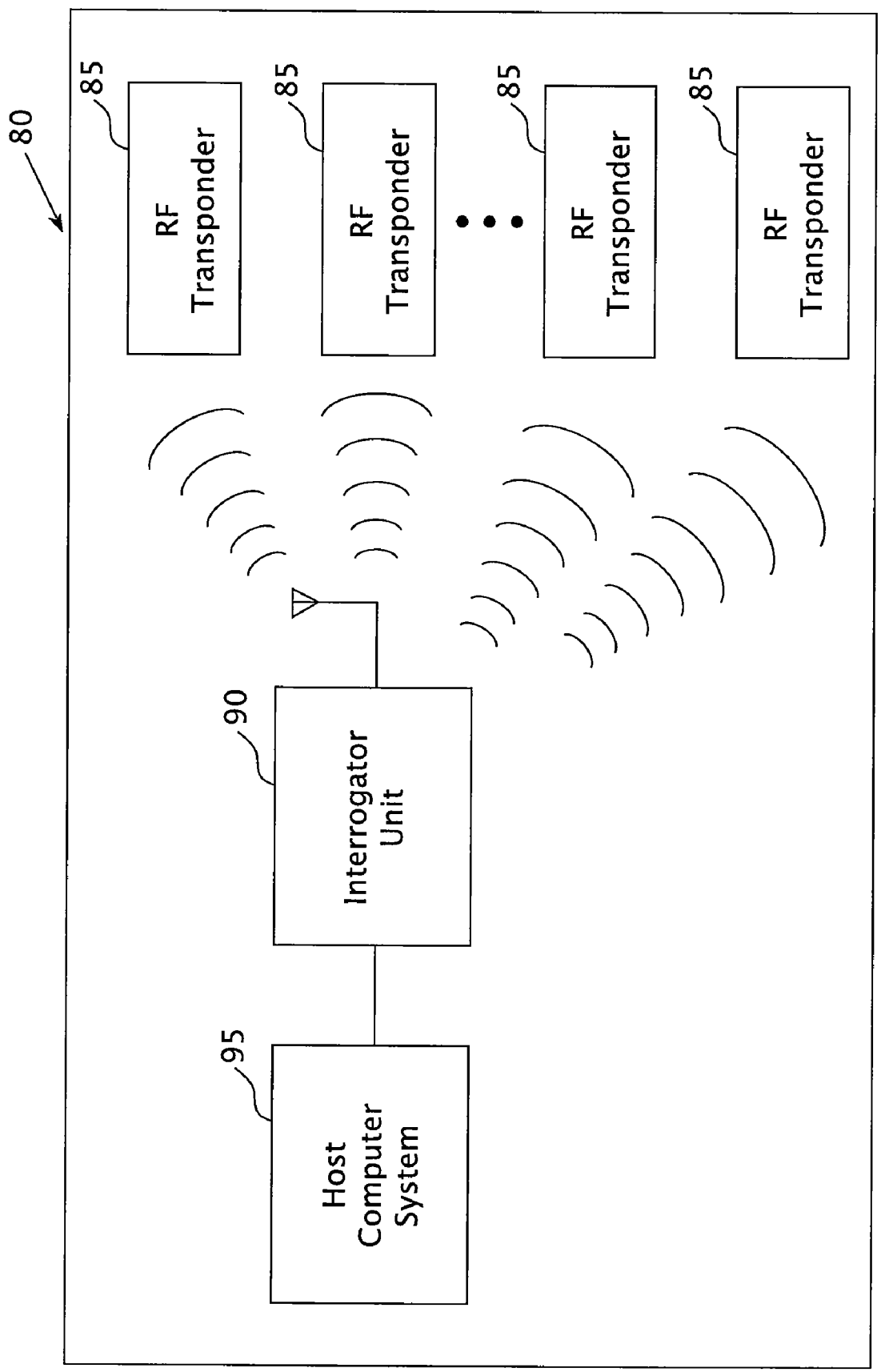
FIG. 8 is a block diagram of an RFID system according to an aspect of the present invention.

FIG. 8 is a block diagram of an RFID system 80 according to an aspect of the present invention. The RFID system 80 includes a plurality of RF transponders 85 deployed in a particular location, such as within a building. The RF transponders 85 may be, without limitation, any of the RF transponder embodiments described herein, such as RF transponder 5, RF transponder 5', RF transponder 50, RF transponder 50' or RF transponder 60. The RF transponders 85 may also be an RF transponder as described in co-pending U.S. provisional application Ser. No. 60/673,715 entitled "Method and Device for Reducing Power Consumption of Active RFID Tags," owned by the assignee of the present invention, the disclosure of which is incorporated herein by reference, or any other type of known or later developed suitable RF transponder. The RFID system 80 further includes an interrogator unit 90 which is in electronic communication with a host (central) computer system 95. Under the control of the host computer system 95, the interrogator unit 90 generates the RF signals (e.g., bursts) that are required to selectively awaken one or more of the RF transponders 85 in the manners described elsewhere herein. Once awakened, each RF transponder 85 may simply transmit some identifying information to the interrogator unit 90 to confirm its presence at the location, or, in those embodiments that permit (e.g., RF transponders 5' and 50), each RF transponder 85 may receive further communications from the interrogator unit 90 (for example, according to the ISO 18000 Part 7 standard) and respond accordingly. Thus, due to the power conserving capabilities of the RF transponder 5, the RF transponder 5', the RF transponder 50, the RF transponder 50' and the RF transponder 60 described elsewhere wherein, the RFID system 80 is able to operate with minimal power consumption and therefore an extended lifetime. In order to avoid collisions in one embodiment, the RF interrogation response signals are transmitted one at a time in a sequential manner, such as according to an order determined by the unique identifier of each RFID tag 110. Other collision avoidance mechanisms are also possible.

Figure 9:
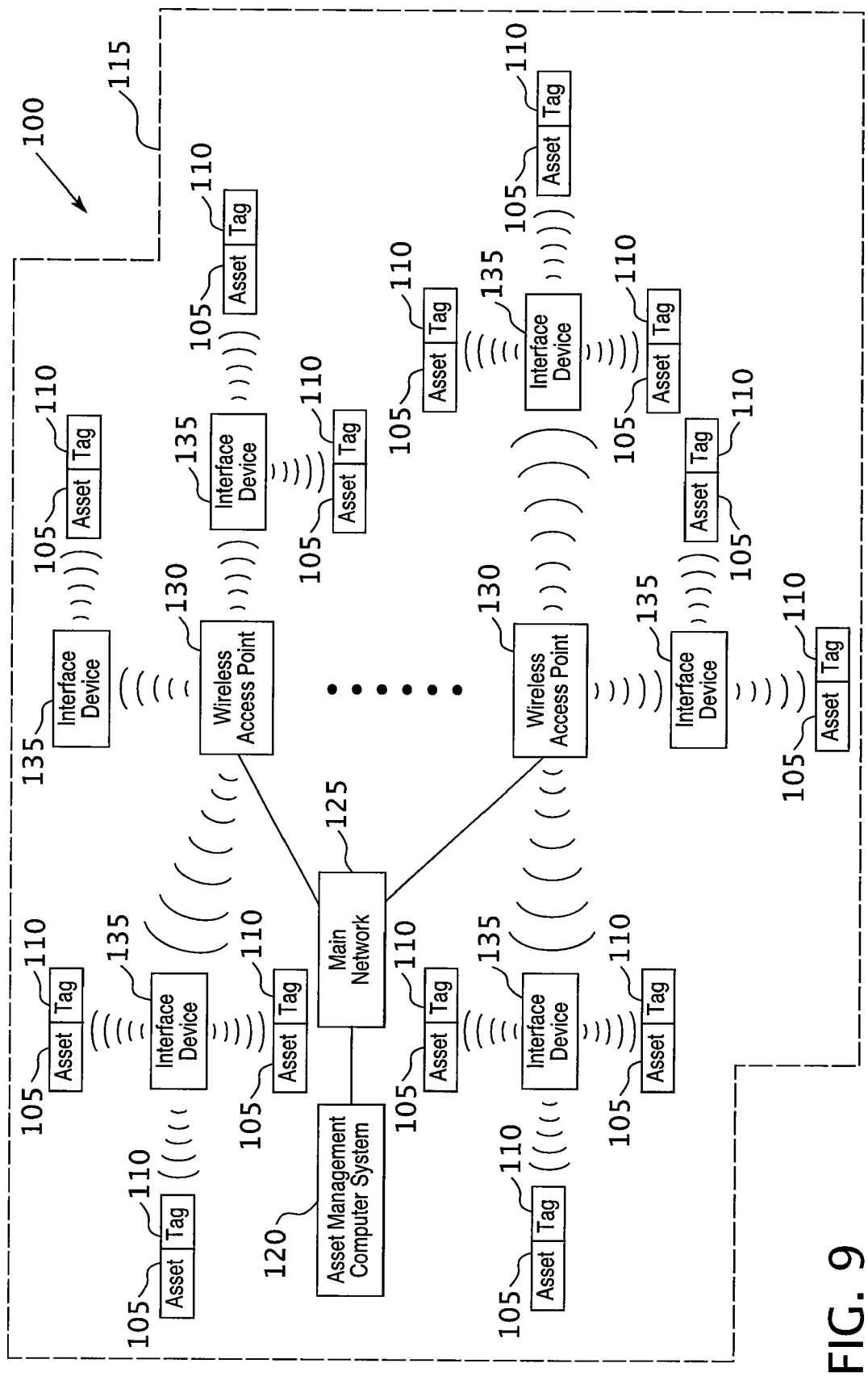
FIG. 9 is a block diagram of an asset management system according to a further aspect of the present invention.

FIG. 9 is a block diagram of an embodiment of an asset management system 100 according to a further aspect of the present invention. The asset management system 100 enables centralized, remote location tracking of a number of assets 105 within a particular location 115, such as, for example and without limitation, a hospital or another environment. The assets 105 may be any type of physical item, including both movable items and items that are permanently or temporarily fixed in place. For example, in a hospital application, the assets 105 may be various types of medial equipment, such as, without limitation, a crash cart, an EKG machine, a wheel chair, a gurney, an oxygen dispenser, a staff member, or a patient. Each of the assets 105 has an RFID tag 110 physically associated therewith, preferably by physically attaching the RFID tag 110 to the asset 105. Each RFID tag 110 is preferably any of the RF transponder embodiments described herein, such as RF transponder 5, RF transponder 5', RF transponder 50, RF transponder 50' or RF transponder 60.

The asset management system 100 further includes a central asset management computer system 120 that is connected to a main network 125. The asset management computer system 120 may include, without limitation, a PC or another suitable computing device that is provided with one or more software applications for implementing the system described herein. As seen in FIG. 9, a number of wireless access points 130 are in electronic communication, preferably wired communication, with the main network 125 and are dispersed throughout the location 115. Each wireless access point 130 is capable of receiving a signal from the main network 125, and thus from the asset management computer system 120, and wirelessly transmitting that signal within a particular defined area. In addition, each wireless access point 130 is capable of receiving wireless signals from within its particular defined area and transmitting those signals to the main network 125, and thus to the asset management computer system 120. The main network 125 and wireless access points 130 thus form a wireless network for the location 115. In the preferred embodiment, the wireless network for the location 115 is a WiFi network that is implemented according to the IEEE 802.11 family of standards, or another suitable standard.

The asset management system 100 also further includes a number of interface devices 135 that are dispersed throughout the location 115. Each interface device 135 is located within the range of at least one of the wireless access points 130. As described in greater detail below, each interface device 135 is capable of receiving wireless (RF) signals from and transmitting wireless (RF) signals to the associated wireless access point 130 according to the appropriate protocol. In addition, each interface device 135 is capable of transmitting RF signals to the RF tags 110 that are in proximity thereto and receiving RF signals from those RF tags 110. In particular, based upon control signals received from the asset management computer system 120 through the main network 125 and the appropriate wireless access point 130, each interface device 135 is capable of transmitting one or more RF signals to the burst switch 10 of the associated RF tags 110 (in the manner or manners described elsewhere herein in connection with the embodiments of the RF transponder 5, the RF transponder 5', the RF transponder 50, the RF transponder 50' and the RF transponder 60) for purposes of causing the processing unit 15 of the associated RF tags 110 to move to an active state. In addition, each interface device 135 is capable of receiving response signals from the associated RF tags 110 after they have been awakened. In this respect, the interface devices 135 function like RFID readers or interrogators. For reasons that will be explained hereinafter, each interface device 135 is provided with an identifier that uniquely identifies it. Such identifiers enable the asset management computer system 120 to associate each interface device 135 with a particular location within the location 115, such as a particular room or wing in a building. This may be done in the form of a table stored by the asset management computer system 120. Thus, each interface 135 can be located or found to be non-functional through the asset management system 100 itself.

Figure 10:
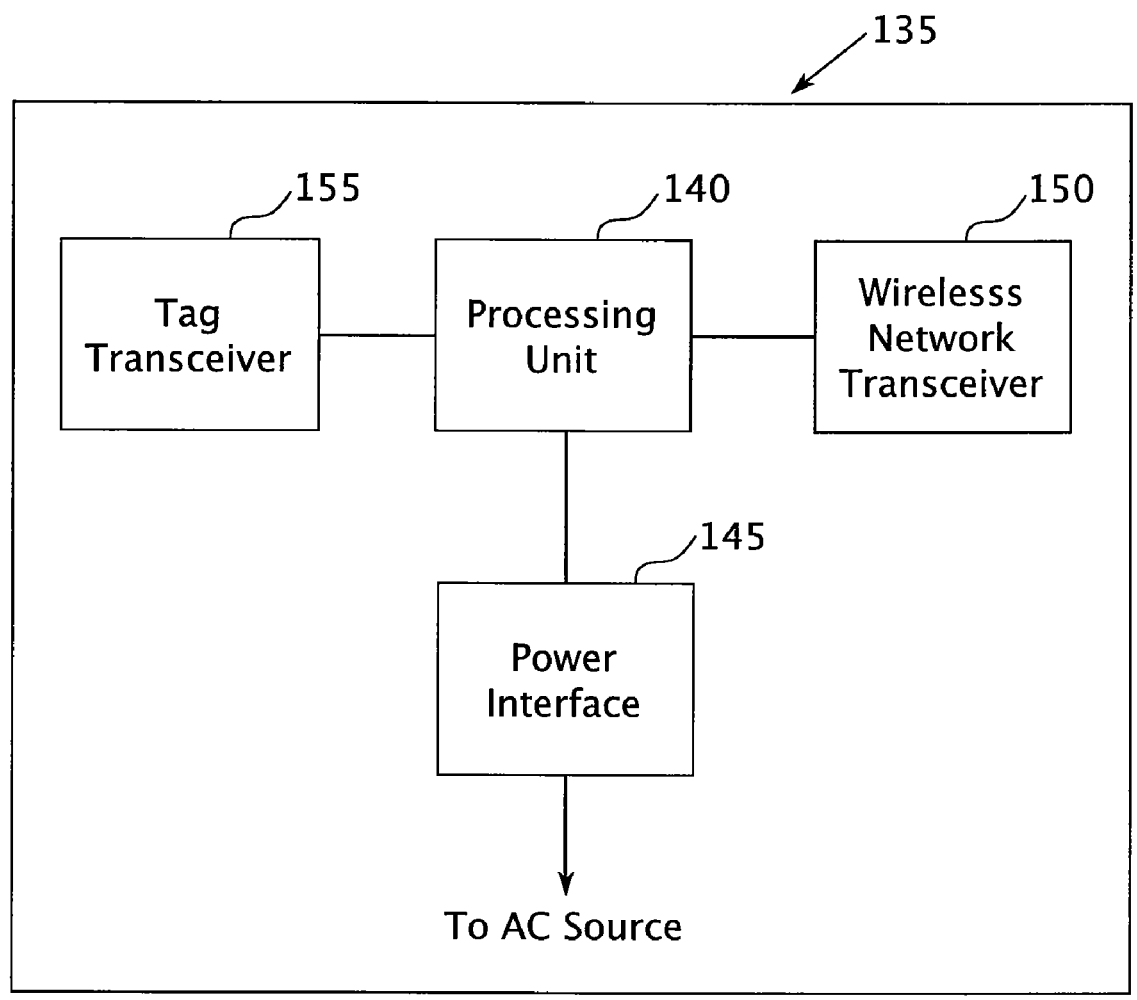
FIG. 10 is a block diagram of an interface device forming a part of the asset management system shown in FIG. 9.

FIG. 10 is a block diagram of an embodiment of the interface device 135 shown in FIG. 9. The interface device 135 includes a processing unit 140, which may be, without limitation, a microprocessor, a microcontroller, or some other type of processor device. The processing unit 140 is electrically connected to a power interface 145 which provides power thereto. The power interface 145 is adapted to be coupled to an AC source, such as a wall outlet, in order to receive an AC voltage. The power interface 145 converts the AC voltage into a DC signal that is suitable for use by the processing unit 140. A wireless network transceiver 150 is provided in electronic communication with the processing unit 140. The wireless network transceiver 150 is adapted to receive wireless (RF) signals from and transmit wireless (RF) signals to one or more wireless access point 130 according to the appropriate protocol, such an 802.11 protocol, using an appropriate frequency, such as 2.45 GHz. In addition, a tag transceiver 155 is provided in electronic communication with the processing unit 140 for enabling the processing unit 140 to transmit appropriate RF signals to the associated RFID tags 110 and to receive appropriate response signals from associated RFID tags 110. Thus, as will be appreciated, each interface device 135 functions as an interface between the two communications systems, i.e., the wireless network implemented by the wireless access points 130 and the wireless communications links to the RFID tags 110. In an alternative embodiment, a separate (dedicated) transmitter may be provided in each interface device 135 for sending the required signals to the burst switch 10, and the RF transceiver 155 may be used for other communication with the RFID tags 110.

In one particular embodiment of the asset management system 100, each of the RFID tags 110 is an RF transponder 5 (or, alternatively, an RF transponder 5'). The burst switch 10 of each of the RF transponders 5 has an antenna 35 that is tuned to a particular frequency or frequency range, such as 433 MHz. In this embodiment, the asset management computer system 120 stores one or more files, such as, without limitation, one or more files in a database, that include for each asset 105 an identification of the asset type (e.g., crash cart, EKG machine, etc.) and a unique identifier for the asset 105. The unique identifier may be, without limitation, a serial number. The RFID tag 110 (i.e., transponder 5) associated with each asset 105 stores the unique identifier for the asset 105. The unique identifier may be stored in a memory of the RFID tag 110 that is part of the processing unit 15 thereof or that is separate from but in electronic communication with the processing unit 15 thereof. When deployed, the processing unit 15 of each RFID tag 110 is in a sleep state, and will remain in that state until awakened as described below.

In operation, this particular embodiment of the asset management system 100 is adapted to track and maintain an inventory of each asset 105 including the particular location of each asset 105 within the location 115. To do so, the asset management computer system 120 periodically or on demand generates an asset interrogation signal. The asset interrogation signal is sent to the main network 125 and then to each wireless access point 130. Each wireless access point 130 then wirelessly transmits the asset interrogation signal according to the appropriate protocol, such as an 802.11 protocol. The wirelessly transmitted asset interrogation signal is received by each interface device 135 that is within the range of each wireless access point 130. In response to receipt of the asset interrogation signal, each interface device 135 generates a second RF interrogation signal having a frequency that will be picked up by the antenna 35 of the burst switch 10 of each RFID tag 110. As described elsewhere herein, when the burst switch 10 of each RFID tag 110 receives the second RF interrogation signal, a DC signal is generated that causes the processing unit 15 of each RFID tag 110 to move to an active state. Each such processing unit 15 is adapted to then cause an RF interrogation response signal of an appropriate frequency (e.g., 433 MHz) to be generated by the associated transmitter 20 in the RFID tag 110. Each RF interrogation response signal includes the unique identifier stored by the RFID tag 110 that generated the RF interrogation response signal. In order to avoid collisions, the RF interrogation response signals are, in one embodiment, transmitted one at a time in a sequential manner, such as according to an order determined by the unique identifier of each RFID tag 110. Other collision avoidance mechanisms are also possible.

The RF interrogation response signals are then received by the respective interface devices 135 (i.e., the interface device 135 that is in proximity to the RFID tag 110 that generated the RF interrogation response signal). Each interface device 135 compiles a list of RF interrogation response signals that is has received, and transmits a second interrogation response signal for the corresponding particular location 137 (FIG. 9) according to the chosen protocol of the wireless network that is implemented. The second interrogation response signal generated and transmitted by each interface device 135 will include the unique identifier of the interface device 135 and the list of RF interrogation response signals complied by the interface device 135. The second interrogation response signals are then received by the associated wireless access points 130 and transmitted to the asset management computer system 120 through the main network 125.

Upon receipt of the second interrogation response signals, the asset management computer system 120 is able to update the location of each asset 105 in its records. In particular, each second interrogation response signal that is received will include a list of unique identifiers that, as described above, uniquely identify each asset 105. Each second interrogation response signal will also include the identifier of the interface device 135 that sent it, thus identifying the location of that interface device 135. As a result, the asset management computer system 120 can use this information to associate a particular location within the location 115 with each asset 105.

As described elsewhere herein, one of the shortcomings of the RF transponders 5 and 5' is that they could be inadvertently awakened by spurious RF noise. This could present a problem for the embodiment of the asset management system 100 just described as the RFID tags 110, being RF transponders 5 or 5' in that embodiment, could be caused to inadvertently send RF interrogation response signals in response to noise. This problem is addressed in an alternative embodiment of the asset management system 100 in which each of the RFID tags 110 is an RF transponder 50 (or, alternatively, an RF transponder 50') that will be awakened by the same burst code, e.g., 5 2 4 6. In this particular embodiment, operation of the asset management system 100 is similar to that described above. However, in this embodiment, the second RF interrogation signal that is generated by each interface device 135 upon receipt of the asset interrogation signal from a wireless access point 130 will be an RF signal consisting of the appropriate RF bursts sufficient to cause the burst switch 10 of each RFID tag 110 to create the required burst code for the filtering circuit 55 of the RFID tag 110. As described elsewhere herein, that code, when received by the filtering circuit 55, will cause a wake-up signal to be generated for the associated processing unit 15, which, in response, will wake-up and generate the appropriate RF interrogation response signal. Thus, in this embodiment, the adverse affects of noise are minimized.

A further shortcoming of the RF transponders 5 and 5' is that there is no mechanism for discriminating among a number of them when deployed, i.e., there is no way to selectively cause only certain ones of them to respond. As a result, the embodiment of the asset management system 100 that utilizes the RF transponder 5 or 5' will be required to interrogate all of the RFID tags 110 each time an inventory update is desired, as opposed to only interrogating selected RFID tags 110 and thus selected assets 105. As will be appreciated, while this will still gather the necessary asset location information, it will cause battery power for certain of the RFID tags 110 to be unnecessarily consumed.

Thus, according to a further aspect of the present invention, a further alternative embodiment of the asset management system 100 is provided in which selected ones and/or selected groups of the RFID tags 110 may be interrogated. In this particular embodiment, each of the RFID tags 110 is an RF transponder 50 (or, alternatively, an RF transponder 50') that may be awakened by a burst code that is unique to that RFID tag 110. For example, each individual RFID tag 110 may be assigned a unique 4 element burst code as described elsewhere herein (such as 5 2 4 6) (a 4 element burst code is merely an example, and it should be understood that the burst code may have more or less than 4 elements). As a result, each of those RFID tags 110 may be selectively, individually interrogated by the asset management computer system 120 in the manner described elsewhere herein using the appropriate burst code in order to determine the current location thereof. In addition, one or more of the RFID tags 110 may also be adapted to be awakened by a particular burst code that is common to a selected group of RFID tags 110. In other words, certain groups of RFID tags 110 (and thus certain groups of assets 105) may also be assigned a second burst code that may be used to awaken each of the RFID tags 110 in the group. For example, all assets 105 of type one (e.g., crash carts, or assets on floor one of a building) may be assigned the burst code 4 2 4 3, all assets 105 of type two (e.g., EKG machines, or assets on floor two of a building) may be assigned the burst code 3 1 4 2, etc. As a result, the location of all assets 105 in a particular group, such as crash carts, can be readily determined, if desired, by the asset management system 100 using a single burst code.

As will be appreciated, in the embodiment of the asset management system 100 just described, each asset interrogation signal that is sent by the asset management computer system 120 will need to include information that identifies the particular burst code that is to be used for that interrogation. The interface devices 135 will then use that information to generate the appropriate second RF interrogation signals that are transmitted. When multiple assets 105 or specified groups thereof are to be interrogated in this manner, the asset management computer system 120 will preferably generate and transmit the appropriate asset interrogation signals in a sequential fashion in order to avoid signal collision problems (the responses will also be sent in a similar, corresponding sequential fashion). Thus, according to an aspect of the present invention, the asset management computer system 120 maintains a table or similar record that links each asset 105 with the code or codes that may be used to awaken the RFID tag 110 associated with the asset 105. That same table or other record will also preferably separately list specified asset groups (e.g., crash cards, EKG machines, assets in a particular wing, etc.) and the common code that is assigned to each group so that such common codes may be readily accessed.

In yet a further alternative embodiment of the asset management system 100, each of the RFID tags 110 is an RF transponder 60 that, as described elsewhere herein, is able to be awakened by a particular combination or sequence of burst switch frequencies. This embodiment is similar to the embodiment of the asset management system 100 described above that employs the RF transponders 50 or 50', except that the burst codes are replaced by specified combinations or sequences of burst switch frequencies. The basic operation of the asset management system 100 otherwise remains essentially the same.

The present invention therefor provides a number of embodiments of RF transponders and assets management systems employing the same that minimize the power that is consumed by each transponder. As a result, the lifetime of each RF transponder may be maximized.

While preferred embodiments of the invention have been described and illustrated above, it should be understood that these are exemplary of the invention and are not to be considered as limiting. For example, the majority of the description contained herein describes the burst switch 10 as awakening a processing unit 15. It should be appreciated that the burst switch 10 may be utilized to awaken any type of electronic device that is capable of entering an inactive, sleep state. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A transponder apparatus, comprising:
  an electronic device, said electronic device being switchable between an inactive, sleep state and an active state;
  a power source in electronic communication with said electronic device, said power source providing power to said electronic device;
  a switch having an antenna for receiving at least one RF signal, said switch converting said at least one RF signal into at least one DC signal; and
  a filtering circuit in electronic communication with said switch, wherein said at least one DC signal is provided to said filtering circuit, wherein responsive to receiving said at least one DC signal said filtering circuit analyzes said at least one DC signal and determines whether said at least one DC signal has a predetermined format, wherein said predetermined format comprises a predetermined number of bursts, each of said bursts having a predetermined duration, and wherein said filtering circuit provides a wake-up signal to said electronic device to cause said electronic device to move from said inactive, sleep state to said active state only if it is determined that said at least one DC signal has said predetermined format.

2. The transponder apparatus according to claim 1, wherein said switch includes a rectifying circuit for converting said at least one RF signal into said at least one DC signal.

3. The transponder apparatus according to claim 2, wherein said rectifying circuit is a charge pump.

4. The transponder apparatus according to claim 3, wherein said switch further includes a matching network electrically connected to said antenna and wherein said charge pump is electrically connected to an output of said matching network.

5. The transponder apparatus according to claim 1, wherein said power source is a battery.

6. The transponder apparatus according to claim 1, wherein said electronic device is a processing unit.

7. The transponder apparatus according to claim 6, further comprising an RF transmitter in electronic communication with said processing unit.

8. The transponder apparatus according to claim 1, wherein said antenna is tuned to a particular frequency or range of frequencies, and wherein said at least one RF signal has a frequency that is substantially equal to said particular frequency or is within said range of frequencies.

9. The transponder apparatus according to claim 6, further comprising an RF receiver in electronic communication with said processing unit.

10. The transponder apparatus according to claim 1, wherein said at least one RF signal comprises a plurality of RF bursts, and wherein said at least one DC signal comprises a corresponding plurality of DC bursts.

11. The transponder apparatus according to claim 1, wherein said transponder apparatus is an RFID tag and wherein said at least one RF signal is transmitted by an RFID reader device.

12. The transponder apparatus according to claim 1, wherein said switch does not require power from said power source or another power source within or connected to said transponder apparatus.

13. The transponder apparatus according to claim 12, wherein said filtering circuit is electrically connected to said power source and receives power from said power source.

14. A transponder apparatus, comprising:
an electronic device, said electronic device being switchable between an inactive, sleep state and an active state;
a power source in electronic communication with said electronic device, said power source providing power to said electronic device;
a switch having an antenna for receiving at least one RF signal, said switch converting said at least one RF signal into at least one DC signal; and
a filtering circuit in electronic communication with said switch, wherein said at least one DC signal is provided to said filtering circuit, wherein responsive to receiving said at least one DC signal said filtering circuit analyzes said at least one DC signal and determines whether said at least one DC signal has a first predetermined format, wherein said at least one RF signal comprises a plurality of RF bursts, and wherein said predetermined format comprises a predetermined number of bursts, each of said bursts having a predetermined duration, and wherein said filtering circuit will provide a wake-up signal to said electronic device to cause said electronic device to move from said inactive, sleep state to said active state only if it is determined that said at least one DC signal has said first predetermined format, wherein said at least one DC signal will have said first predetermined format only if said at least one RF signal has a second predetermined format.

15. A method of moving an electronic device included in a transponder apparatus from an inactive, sleep state to an active state, wherein said electronic device consumes power from a power source of said transponder apparatus in said active state, comprising:
receiving at least one RF signal and converting said at least one RF signal into at least one DC signal without consuming power from said power source or another power source within or connected to said transponder apparatus;
analyzing said at least one DC signal and determining whether said at least one DC signal has a predetermined format wherein said predetermined format comprises a predetermined number of bursts, each of said bursts having a predetermined duration; and
providing a wake-up signal to said electronic device only if it is determined that said at least one DC signal has said predetermined format, said wake-up signal causing said electronic device to move from said inactive, sleep state to said active state.

16. The method according to claim 15, wherein said at least one RF signal has a frequency that is substantially equal to a particular frequency or is within a particular range of frequencies.

17. The method according to claim 15, wherein said at least one RF signal comprises a plurality of RF bursts, and wherein said at least one DC signal comprises a plurality of DC bursts, and wherein said determining step comprises determining whether said DC bursts have said predetermined format.

18. The method according to claim 15, wherein said transponder apparatus is an RFID tag and wherein said receiving step comprises receiving said at least one RF signal from an RFID reader device.

19. The method according to claim 15, wherein said power source is a battery.

20. The method according to claim 15, wherein said electronic device is a processing unit.

21. The method according to claim 15, wherein said transponder apparatus is an RFID tag, and wherein said receiving step includes receiving said at least one RF signal from an RFID reader device.

22. A method of moving an electronic device included in a transponder apparatus from an inactive, sleep state to an active state, wherein said electronic device consumes power from a power source of said transponder apparatus in said active state, comprising:
receiving at least one RF signal and converting said at least one RF signal into at least one DC signal without consuming power from said power source or another power source within or connected to said transponder apparatus;
analyzing said at least one DC signal and determining whether said at least one RF signal has a predetermined format based on said at least one DC signal wherein said at least one RF signal comprises a plurality of RF bursts, wherein said determining step comprises determining whether said RF bursts have said predetermined format, and wherein said predetermined format comprises a predetermined number of bursts, each of said bursts having a predetermined duration; and
providing a wake-up signal to said electronic device to cause said electronic device to move from said inactive, sleep state to said active state only if it is determined that said at least one RF signal has said predetermined format.

* * * * *

UNITED STATES PATENT AND TRADEMARK OFFICE
CERTIFICATE OF CORRECTION

PATENT NO. : 7,876,225 B2  
APPLICATION NO. : 11/678296  
DATED : January 25, 2011  
INVENTOR(S) : Marlin H. Mickle et al.

Page 1 of 1

It is certified that error appears in the above-identified patent and that said Letters Patent is hereby corrected as shown below:

Column 1, line 28, "ments" should read --ment--.
Column 1, line 51, "RID reader" should read --RFID reader--.
Column 4, line 48, "signals" should read --signal--.
Column 4, line 50, "signals" should read --signal--.
Column 5, line 45, "building" should read --buildings--.
Column 6, line 3, "transponder" should read --transponders--.
Column 8, line 1, "conducing" should read --conducting--.
Column 10, line 28, "in manner" should read --in a manner--.
Column 11, line 24, "in order allow" should read --in order to allow--.
Column 11, line 62, "transponder 50" should read --transponder 50'--.
Column 12, line 1, "wherein," should read --herein--.
Column 12, line 17, "medial" should read --medical--.
Column 12, line 19, "wheel" should read --wheel- --.
Column 13, line 31, "point" should read --points--.
Column 13, line 32, "such an" should read --such as an--.
Column 14, line 35, "is has" should read --it has--.
Column 14, line 42, "signals complied" should read --signals compiled--.
Column 15, line 21, "as result" should read --as a result--.
Column 16, line 24, "therefor" should read --therefore--.

Signed and Sealed this  
Thirty-first Day of July, 2012

David J. Kappos  
*Director of the United States Patent and Trademark Office*